US007730257B2

(12) United States Patent
Franklin (10) Patent No.: US 7,730,257 B2
(45) Date of Patent: Jun. 1, 2010

(54) METHOD AND COMPUTER PROGRAM PRODUCT TO INCREASE I/O WRITE PERFORMANCE IN A REDUNDANT ARRAY

(75) Inventor: Chris Robert Franklin, Merrimack, NH (US)

(73) Assignee: Broadcom Corporation, Irvine, CA (US)

( * ) Notice: Subject to any disclaimer, the term of this patent is extended or adjusted under 35 U.S.C. 154(b) by 179 days.

(21) Appl. No.: 11/012,609

(22) Filed: Dec. 16, 2004

(65) Prior Publication Data
US 2006/0136654 A1 Jun. 22, 2006

(51) Int. Cl.
G06F 12/00 (2006.01)
G06F 13/00 (2006.01)
G06F 13/28 (2006.01)

(52) U.S. Cl. .................. 711/114; 711/142; 711/143

(58) Field of Classification Search .................. 711/114, 711/142, 143
See application file for complete search history.

(56) References Cited

U.S. PATENT DOCUMENTS

| 4,413,317 | A | * | 11/1983 | Swenson | 711/114 |
|---|---|---|---|---|---|
| 5,247,671 | A | * | 9/1993 | Adkins et al. | 718/103 |
| 5,488,731 | A | * | 1/1996 | Mendelsohn | 711/114 |
| 5,533,190 | A | * | 7/1996 | Binford et al. | 714/6 |
| 5,586,291 | A | * | 12/1996 | Lasker et al. | 711/113 |
| 5,617,530 | A | * | 4/1997 | Stallmo et al. | 714/6 |
| 5,734,814 | A | * | 3/1998 | Corbin et al. | 714/6 |
| 5,754,888 | A | * | 5/1998 | Yang et al. | 710/52 |
| 5,774,643 | A | * | 6/1998 | Lubbers et al. | 714/20 |
| 5,928,367 | A | * | 7/1999 | Nelson et al. | 714/6 |
| 6,052,120 | A | * | 4/2000 | Nahi et al. | 715/700 |
| 6,230,240 | B1 | * | 5/2001 | Shrader et al. | 711/114 |
| 6,247,060 | B1 | * | 6/2001 | Boucher et al. | 709/238 |
| 6,366,968 | B1 | * | 4/2002 | Hunsaker | 710/52 |
| 6,513,093 | B1 | * | 1/2003 | Chen et al. | 711/4 |
| 6,591,349 | B1 | * | 7/2003 | Steinman et al. | 711/154 |
| 7,047,358 | B2 | * | 5/2006 | Lee et al. | 711/114 |
| 7,124,244 | B2 | * | 10/2006 | Shimada | 711/113 |
| 2004/0218623 | A1 | * | 11/2004 | Goldenberg et al. | 370/463 |

OTHER PUBLICATIONS

Samuel A. Fineberg and Don Wilson, Performance Measurements of a User-Space DAFS Server with a Database Workload, Aug. 2003, ACM Press, pp. 185-195.*
David A. Patterson et al., "A Case for Redundant Arrays of Inexpensive Disks (RAID)," 1988, Computer Science Division, Dept. of Electrical Engineering and Computer Science, University of California, ACM 0-89791-268-3, pp. 109-116 8 pages).
"Raid," SearchStorage.com Definitions, May 2004, 3 pages.

* cited by examiner

*Primary Examiner*—Matt Kim
*Assistant Examiner*—Ralph A Verderamo, III
(74) *Attorney, Agent, or Firm*—Sterne, Kessler, Goldstein & Fox, PLLC (57) ABSTRACT

A method and related computer program product for achieving high performance I/O write rates in a redundant array using a fully recoverable communication queue stored in NVRAM on a RAID controller comprising, receiving an I/O write request from an application, determining if the I/O request is an inline write command, writing inline write commands into a command queue stored in NVRAM, notifying the application generating the I/O request of command completion and requesting the operating system for further I/Os.

32 Claims, 6 Drawing Sheets

METHOD AND COMPUTER PROGRAM PRODUCT TO INCREASE I/O WRITE PERFORMANCE IN A REDUNDANT ARRAY

FIELD OF THE INVENTION

This invention generally relates to RAID controllers and more specifically to increasing I/O write performance for RAID controllers.

BACKGROUND OF THE INVENTION

There are many applications, particularly in a business environment, where there are needs beyond what can be fulfilled by a single hard disk, regardless of its size, performance or quality level. Many businesses can't afford to have their systems go down for even an hour in the event of a disk failure. They need large storage subsystems with capacities in the terabytes. And they want to be able to insulate themselves from hardware failures to any extent possible. Some people working with multimedia files need fast data transfer exceeding what current drives can deliver, without spending a fortune on specialty drives. These situations require that the traditional "one hard disk per system" model be set aside and a new model be employed for storage. This technique is called Redundant Arrays of Inexpensive Disks or RAID. ("Inexpensive" is sometimes replaced with "Independent", but the former term is the one that was used when the term "RAID" was first coined by the researchers at the University of California at Berkeley, who first investigated the use of multiple-drive arrays in 1987. See D. Patterson, G. Gibson, and R. Katz. "A Case for Redundant Array of Inexpensive Disks (RAID)", Proceedings of ACM SIGMOD '88, pages 109-116, June 1988.

The fundamental structure of a RAID is the array. An array is a collection of drives that is configured, formatted and managed in a particular way. The number of drives in the array, and the way that data is split between them, is what determines the RAID level, the capacity of the array, and its overall performance and data protection characteristics.

A RAID appears to the operating system to be a single logical hard disk. RAID employs the technique of "striping", which involves partitioning each drive's storage space into units ranging from a sector (512 bytes) up to several megabytes. The stripes of all the disks are interleaved and addressed in order.

Most modern, mid-range to high-end disk storage systems are arranged as RAID configurations. A number of RAID levels are known. RAID-0 "stripes" data across the disks. RAID-1 includes sets of 1 data disk and 1 mirror disk for keeping a realtime copy of the data disks. RAID-3 includes sets of N data disks and one parity disk, and is accessed via specialized hardware which combines the data from the synchronized spindles. RAID-4 also includes sets of N+1 disks, however, data transfers are performed in multi-block operations. RAID-5 distributes parity data across all disks in each set of N+1 disks. RAID levels 10, 30, and 50 are hybrid levels that combine features of level 0, with features of levels 1, 3, and 5. One description of RAID types can be found at the Search Storage web page TechTarciet definition "RAID". May 2004.

Thus RAID or Redundant Array of Independent Disks is simply several disks that are grouped together in various organizations to improve the performance and/or the reliability of a computer's storage system. These disks are grouped and organized by a RAID controller.

All I/O to a redundant array is channeled through the RAID controller. The operating system sends an I/O request to the host driver. The host driver communicates the I/O request through an interconnect such as a PCI or ISA bus to the RAID controller. These I/O requests are then issued by the RAID controller to respective disks in the array.

Most RAID configurations have a parity block in each stripe that allows data recovery if a disk in the array fails or is corrupted. If a disk in the array is written to every time there is a write command then the parity block will have to be re-calculated each time there is a write. For example in a RAID 5 array, writing each block individually involves reading the old data block, reading the parity block, computing the new parity block, writing the new data block and writing the parity block. Thus each write command requires computation of the parity block and four accesses to the disk. This causes increased write latency and lower I/O throughput. If the writes to a stripe in the array are cached and written together, then this reduces the number of accesses to the disk and requires only one computation of the parity block, thereby reducing the write latency and increasing I/O throughput. This technique is commonly known as write back caching. Most RAID controllers today implement write back caching by storing successive writes in main memory or NVRAM (Non-Volatile Random Access Memory) and then performing multiple writes to the disk simultaneously, thereby avoiding the need to read multiple old data blocks and perform multiple re-calculations of the parity block for each write. This technique minimizes disk accesses and thereby minimizes disk head movement resulting in lower latency.

The rate at which I/Os can be received from the OS and issued to a disk in a redundant array is optimized by a RAID controller so as to minimize disk head movement. Conventional RAID controllers send an interrupt to the OS for further I/Os after previously received I/Os have been issued to the appropriate disks or the controller has saved the write data in memory (write back caching). This technique allows writes to take place from NVRAM while new I/O requests are being received from the OS. Data stored in NVRAM is recoverable during reboot in the event of system failure. However, this method involves the delay of first writing the command to the command queue and then backing up the data in NVRAM, followed by writing a response indicating command completion to the response queue before the RAID controller can send an interrupt to the OS and request new I/Os. The time interval between writing the command to the command queue, backing up the data in NVRAM, writing a response to the response queue and then sending an interrupt to the OS and receiving new I/Os results in significant latency and reduces I/O throughput.

DMA (Direct Memory Access) write requests have to be processed as they are received because the data is usually too large to be stored as part of a command. The user can only be notified of command completion when the DMA access has been completed (or the DMA has backed up the data in NVRAM) and a response has been written to the response queue. However, this is not the case for smaller sizes of write data.

"Inline data" refers to smaller write data sizes (typically 512 bytes to 1Kb). "Optimal inline maximum" refers to data sizes typically greater than 16Kb. Inline data can be included with the command as part of a command write packet. "Inline write commands" are commands that have inline data included with the command as part of a command write packet. These commands need not have the restrictions associated with DMA write requests as mentioned above.

What is needed is a method to reduce the latency involved with processing inline write commands.

SUMMARY OF THE INVENTION

The present invention is directed to a method for reducing the latency involved with processing inline write commands. There is provided a computer system with a RAID controller that uses NVRAM either on or off the controller card.

Inline write data with the corresponding write command is written as part of a command packet to a command queue stored in non-volatile memory. The application generating the I/O write request is notified of write completion when the inline write command has been written to the command queue stored in NVRAM. In case of system failure the command queue is recoverable from the non-volatile memory upon reboot.

Additional features and advantages of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed. The detailed description is not intended to limit the scope of the claimed invention in any way.

DESCRIPTION OF THE FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The embodiments presented herein are directed to a technique for achieving high performance I/O write rates using a RAID controller in conjunction with non-volatile memory (e.g. NVRAM). When an I/O write request is received from an application (through the OS layer), the write command may be optimized by including the write data with the command (i.e. using an inline write command). Inline write commands are stored in a command queue in NVRAM. After the inline write command is written to the command queue, the application generating the write request is notified of command completion even though the write has yet to be issued to a disk in the array. This allows the RAID controller to receive further write commands from the OS while the command queue processes previously received inline write requests.

In case of system failure before all inline write commands stored in the command queue can be issued to disk, the command queue will still be available upon reboot because it is stored in NVRAM. Upon reboot, the inline write commands stored in the command queue can be issued to disk thereby ensuring data consistency.

It should be noted that the terms disk, array and redundant array are used interchangeably and all refer to one or more hard disk drives controlled by a RAID controller. The terms RAID controller and controller are also used interchangeably and are differentiated from the DMA controller as required. The terms I/O write requests, write requests, I/O write commands and write commands are used interchangeably and all refer to write commands that are to be issued to a disk in the redundant array. The terms non-volatile memory and NVRAM are used interchangeably. It will be apparent to a person skilled in the relevant art(s) that these refer to memory that retains stored information in the event of system or power failure. The exemplary embodiment uses NVRAM located on the RAID controller card itself, but it is obvious to a person skilled in the art that any form of recoverable memory located anywhere in the computer system can perform the same task.

There are different types of I/O write requests. For present purposes they can be classified into two broad categories. The first type of I/O write commands contain the data to be written, i.e., the inline write commands defined above. The second type are DMA write commands which are commands issued to the DMA controller for data that is greater than the optimal inline maximum defined above.

Exemplary Embodiment

Figure 1:
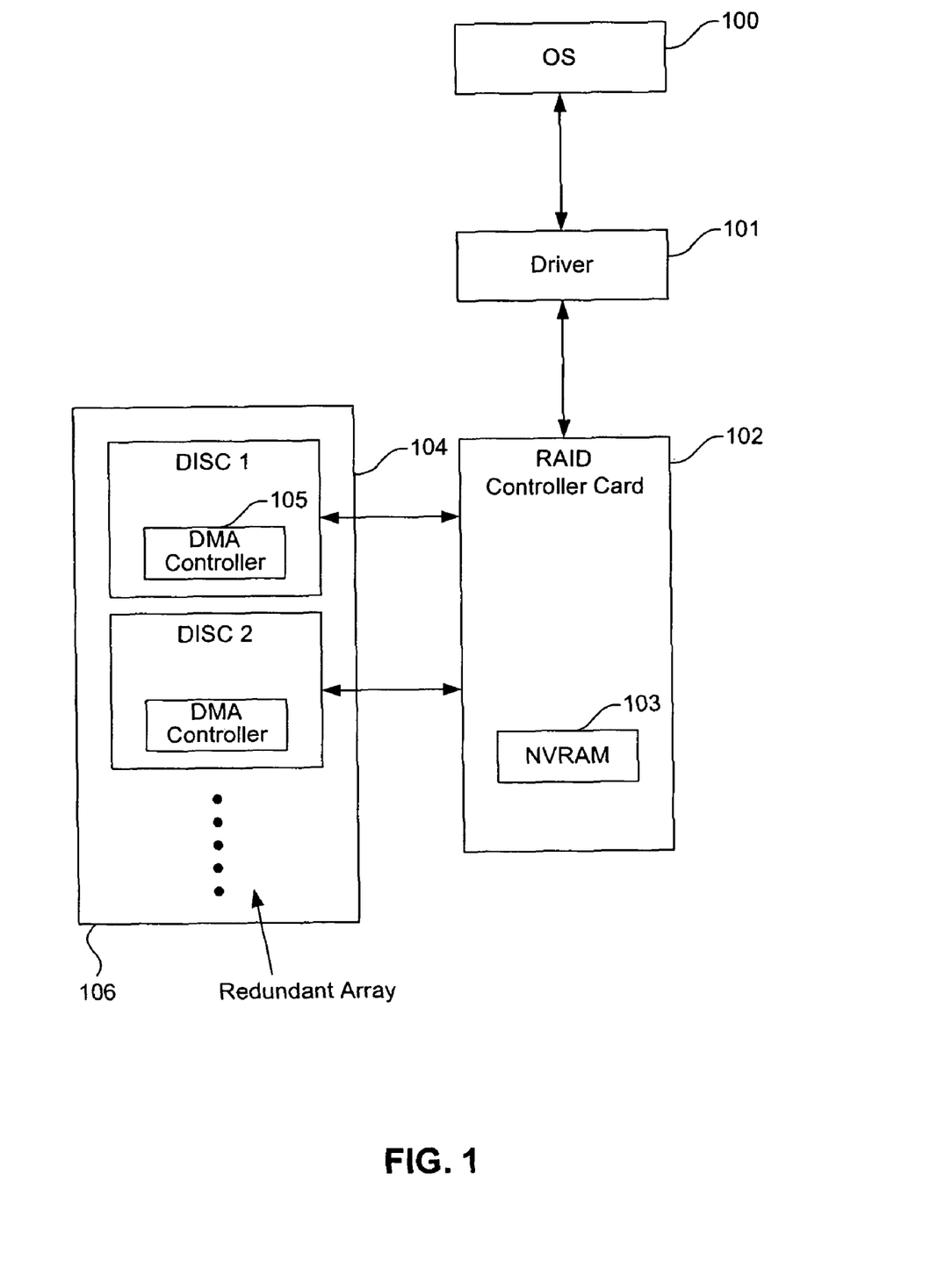
FIG. 1 illustrates the interaction between OS, host driver, RAID controller and disks in the array.

FIG. 1 shows the interaction between the OS, the driver, the RAID controller and the disks in the array. The OS communicates with the driver which in turn generates electrical signals to transfer that information to the RAID controller. The RAID controller controls the disks in the redundant array and transmits the information received from the driver to respective discs in the array. I/O requests generated by applications are issued by the OS to the driver which conveys these I/Os to the RAID controller through electrical signals. The RAID controller issues I/Os to respective disks in the array. The NVRAM 103 is used to store the command queue. The DMA controller 105 on each disk is used to process write requests that are greater than the optimal inline maximum. All the disks managed by the RAID controller 102 are considered part of a redundant array 106.

Figure 2:
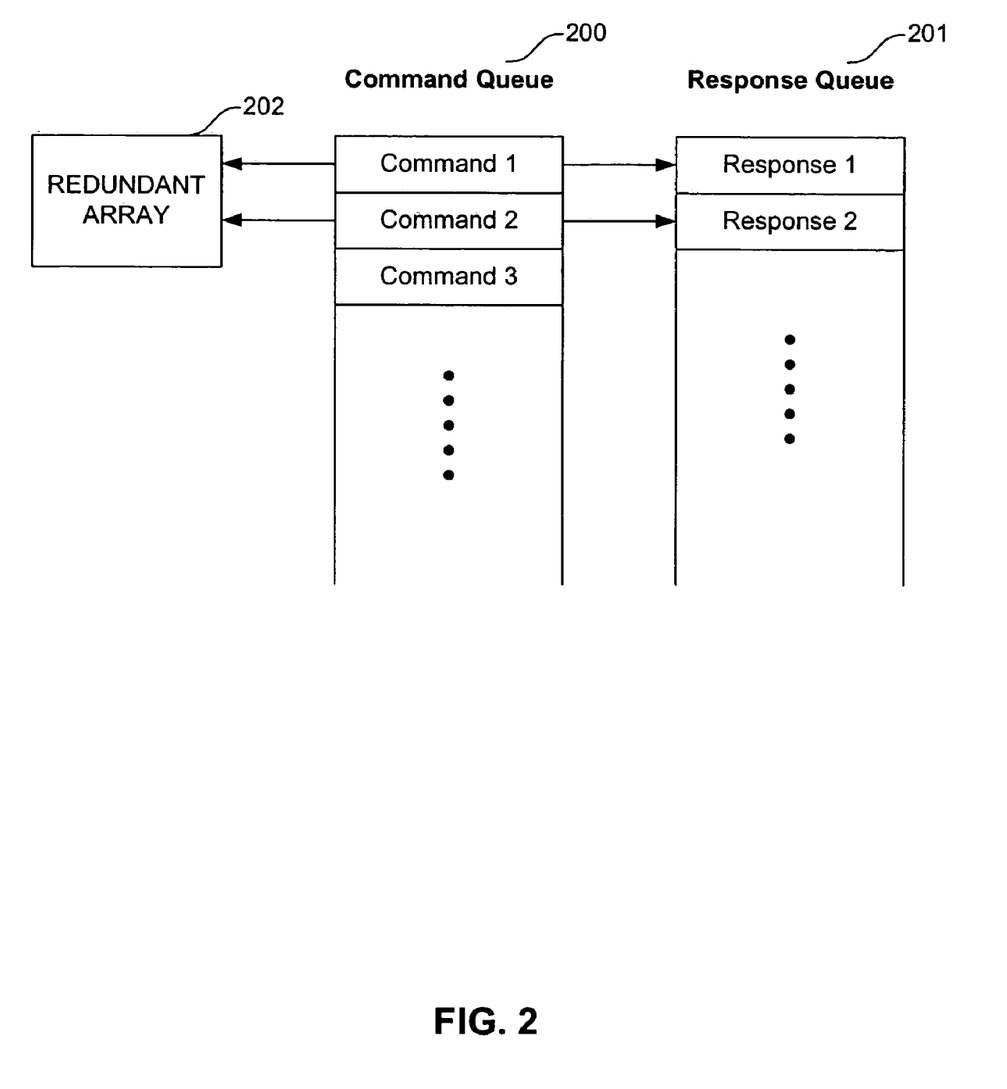
FIG. 2 illustrates the command and response queues.

FIG. 2 shows the command and response queues that are conventionally stored in main memory or volatile RAID controller memory. Commands that will be issued to disks in the array are stored in the command queue. When the commands have been issued to disk, a corresponding response is written to the response queue. Current RAID controllers write commands to the command queue 200, use the DMA controller to store the write data in NVRAM 103 and write a response to the response queue 201 indicating command completion to the application generating the I/O request and requesting new I/Os from the OS. Write commands are issued by the RAID controller 102 from the command queue 200 to a disk in the RAID array 202.

The present embodiment stores the command queue 200 itself in NVRAM 103 so that it is recoverable upon reboot in case of system failure before all commands in the queue could be issued to respective disks in the redundant array 202. The present embodiment also stores entire inline write commands in the command queue 200 whereas those commands requiring DMA access are processed as they are received.

After inline write commands are written to the command queue, a command completion response is sent by the host driver 101 to the application that generated the write request (there will be no response for this command from the RAID controller). Thus the latency involved with writing the command to a command queue followed by using the DMA controller to store the write data in NVRAM before a response indicating command completion could be sent to the application generating the write request is bypassed by transferring the command and data to a command queue in NVRAM. A preferred embodiment proceeds along the steps shown in the flowcharts of FIGS. 3-5. The method is divided into three parts; the host driver side, the RAID controller side upon command receive and the RAID controller side upon system reboot.

Host Driver Side

Figure 3:
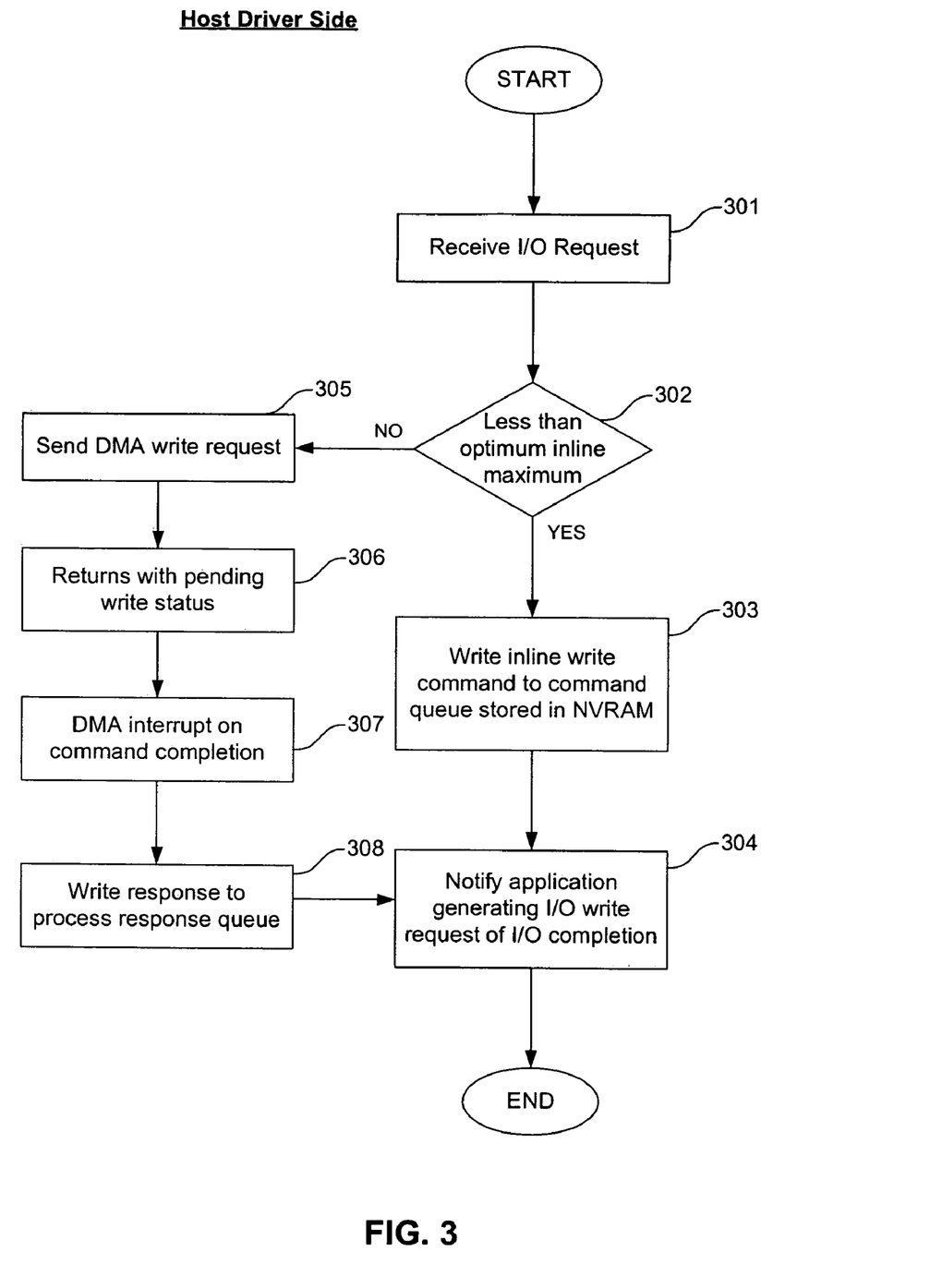
FIG. 3 illustrates an operational flowchart for I/O request processing by the host driver.

FIG. 3 illustrates an operational flowchart for incoming I/O request processing by the host driver. In step 301, the host driver 101 receives an I/O request from the OS. Next in step 302, the host driver determines whether the write data is less than or greater than the optimum inline maximum. Thereafter, in step 303, if the write data is less than the optimum inline maximum, then the driver writes the inline write command to the command queue stored in NVRAM. After that, in step 304, the application generating the I/O write request is notified of command completion even though the actual write to a disk in the array will take place later on. If the write data size was determined in step 303 to be greater than the optimum inline maximum, then in step 305, the host driver sends a DMA write request to the DMA controller on the disk. Next, in step 306, the driver returns with a pending write status which commands the RAID controller to wait till the end of command completion by the DMA controller. In step 307, after completing the write request, the DMA controller signals command completion. Next, in step 308, a command completion response is written to the response queue. Lastly, in step 304, the application generating the I/O write request is notified of I/O completion.

RAID Controller Side

Command Receive

Figure 4:
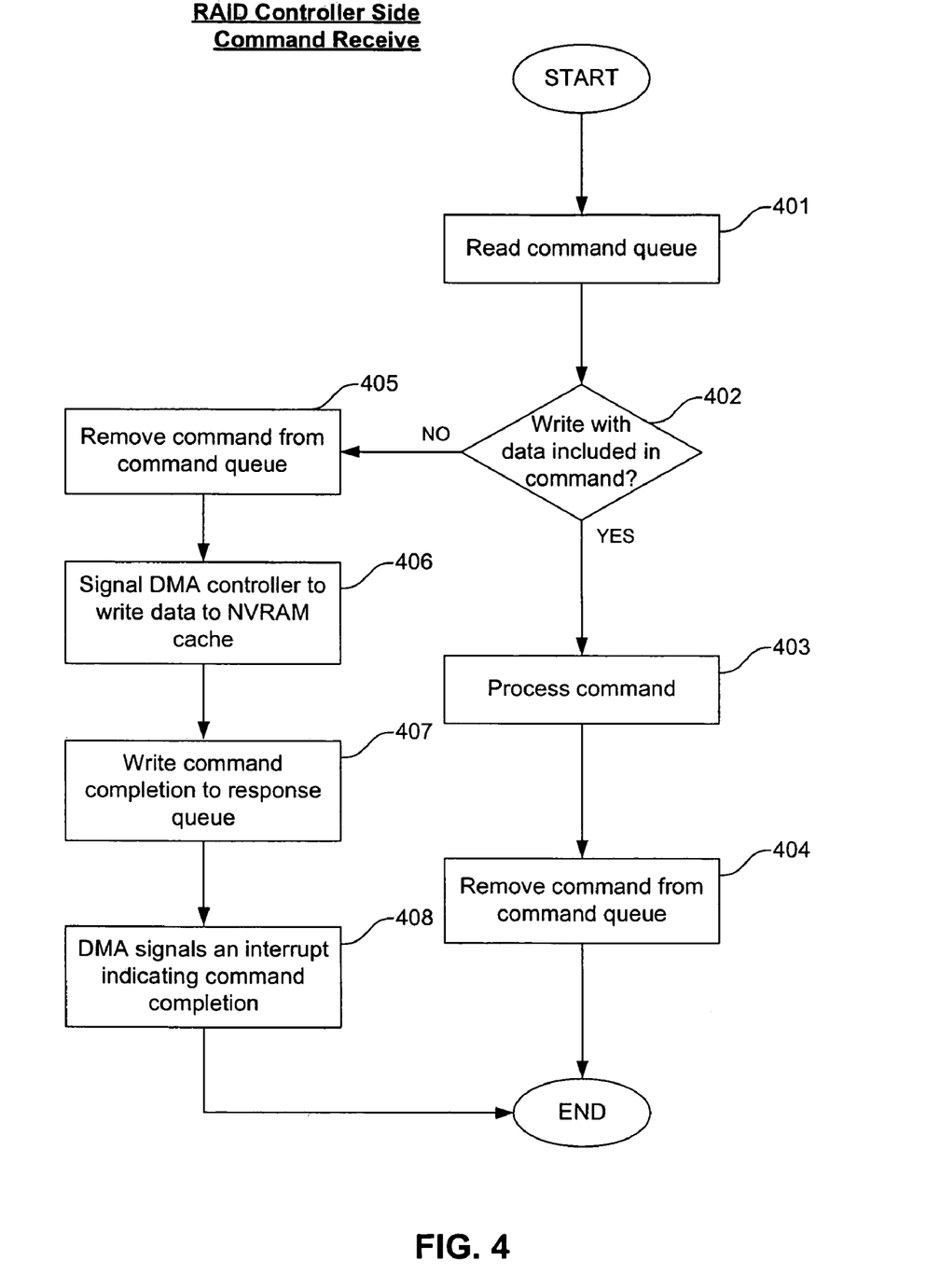
FIG. 4 illustrates an operational flowchart for I/O request processing by the RAID controller.

FIG. 4 illustrates an operational flowchart for I/O request processing by the RAID controller upon receiving a command. In step 401, the RAID controller first reads the command queue. Next, in step 402, it determines if the data is included in the command itself, i.e., whether it is an inline write command. Thereafter, in step 403, if the data is inline, the controller processes the inline write command by issuing it to the respective disk in the array. Then, in step 404, the RAID controller removes the command from the command queue stored in NVRAM. Since in step 304, the application generating the I/O write request was notified of command completion, there is no further need to do so. If the command was determined to not be an inline write command in step 402, then in step 405, the command is removed from the command queue. After that, in step 406, the DMA controller is signaled to write the data to NVRAM. Next, in step 407, after the data has been transferred to NVRAM, a response is written to the response queue. After that, in step 408, the DMA controller signals an interrupt indicating command completion.

Inline Command Queue Recovery Upon System Reboot

Figure 5:
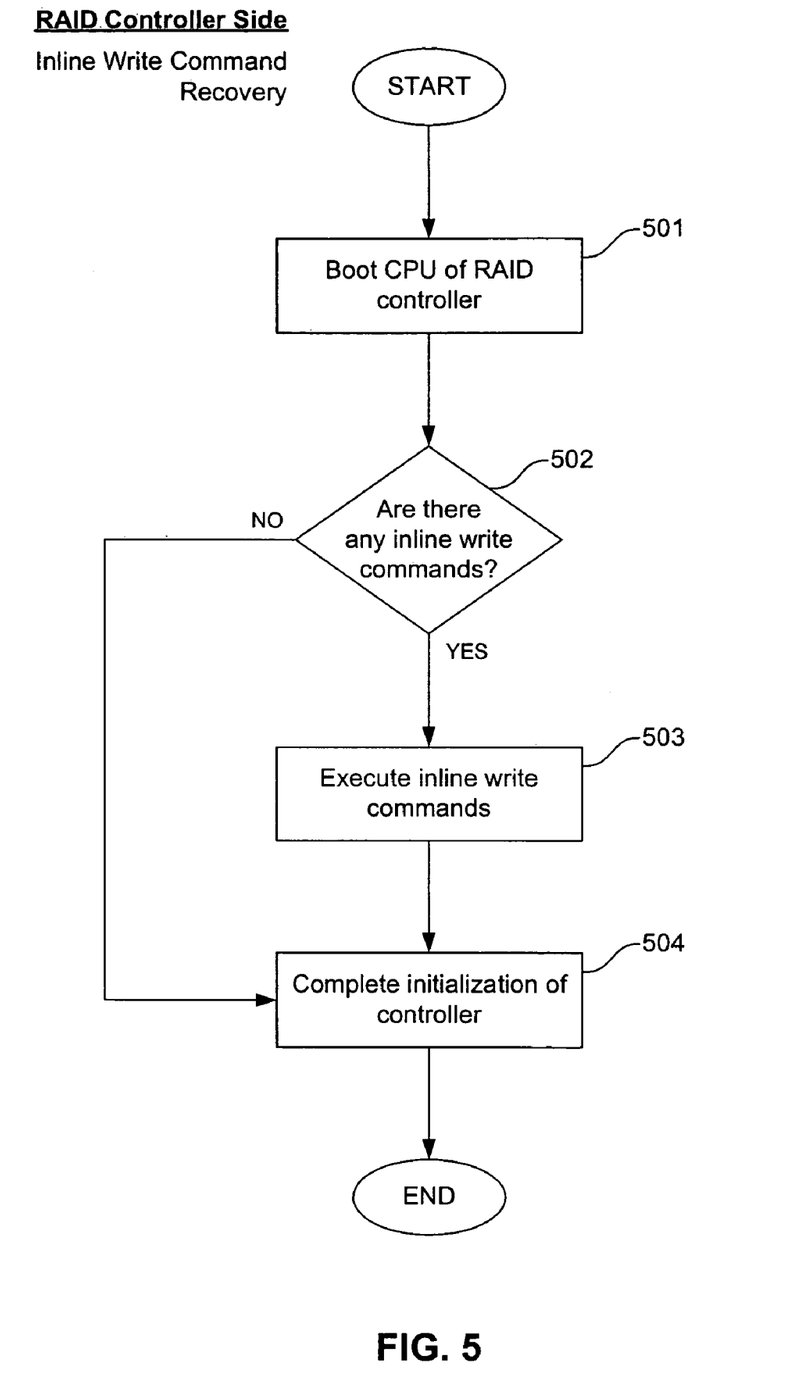
FIG. 5 illustrates an operational flowchart for inline command recovery by the RAID controller upon system reboot.

FIG. 5 illustrates an operational flowchart for inline command recovery by the RAID controller upon system reboot. This process takes place only if the system fails before all the commands in the command queue could be issued to respective disks in the array. In step 501, the RAID CPU also undergoes the boot process during system reboot from failure. In step 502, before completing initialization, the controller determines whether there are any inline write commands in the command queue stored in NVRAM. The NVRAM retains the command queue even after system or power failure. In step 503, if the controller finds any inline write commands in NVRAM, then it issues them to respective disks in the array. The controller continues the issue process until all the inline write commands in the command queue have been issued. Next in step 504, after the command queue is empty, the initialization process for the RAID controller is completed. In step 502, if the RAID controller does not find any inline write commands, it proceeds to step 504 and completes initialization of the controller.

Figure 6:
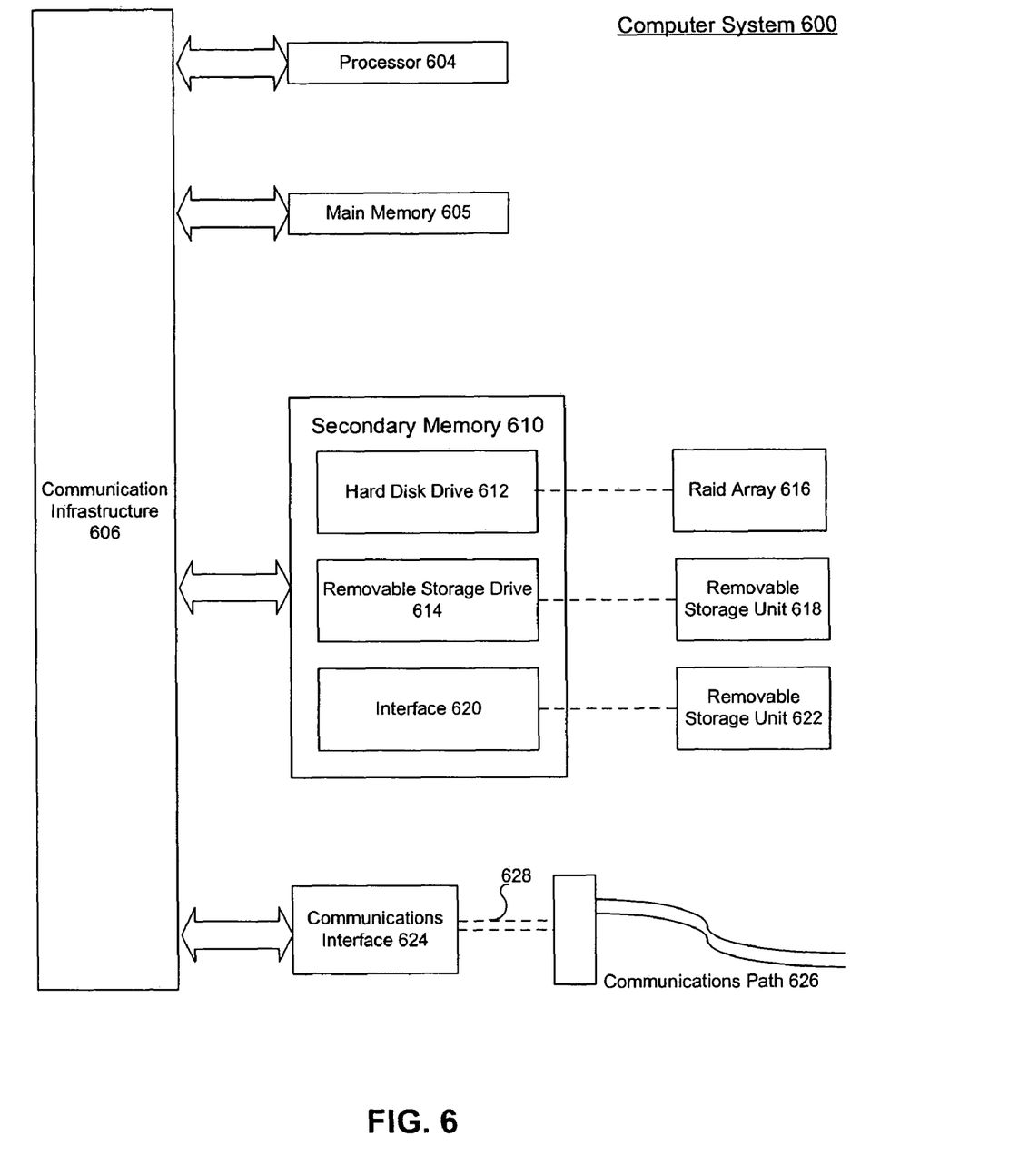
FIG. 6 is a block diagram of a computer system on which the present invention can be implemented.

The following description of a general purpose computer system is provided for completeness. The embodiments presented herein can be implemented in hardware, or as a combination of software and hardware. Consequently, the embodiments may be implemented in the environment of a computer system or other processing system. An example of such a computer system 600 is shown in FIG. 6. The computer system 600 includes one or more processors, such as processor 604. Processor 604 can be a special purpose or a general purpose digital signal processor. The processor 604 is connected to a communication infrastructure 606 (for example, a bus or network). Various software implementations are described in terms of this exemplary computer system. After reading this description, it will become apparent to a person skilled in the relevant art how to implement the invention using other computer systems and/or computer architectures.

Computer system 600 also includes a main memory 605, preferably random access memory (RAM), and may also include a secondary memory 610. The secondary memory 610 may include, for example, a hard disk drive 612, and/or a RAID array 616, and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618, represents a floppy disk, magnetic tape, optical disk, etc. As will be appreciated, the removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a PCMCIA slot and card, etc. Software and data transferred via communications interface 624 are in the form of signals 628 which may be electronic, electromagnetic, optical or other signals capable of being received by communications interface 624. These signals 628 are provided to communications interface 624 via a communications path 626. Communications path 626 carries signals 628 and may be implemented using wire or cable, fiber optics, a phone line, a cellular phone link, an RF link and other communications channels.

The terms "computer program medium" and "computer usable medium" are used herein to generally refer to media such as removable storage drive 614, a hard disk installed in hard disk drive 612, and signals 628. These computer program products are means for providing software to computer system 600.

Computer programs (also called computer control logic) are stored in main memory 608 and/or secondary memory 610. Computer programs may also be received via communications interface 624. Such computer programs, when executed, enable the computer system 600 to implement the present invention as discussed herein. In particular, the computer programs, when executed, enable the processor 604 to implement the processes of the present invention. Where the invention is implemented using software, the software may be stored in a computer program product and loaded into computer system 600 using raid array 616, removable storage drive 614, hard drive 612 or communications interface 624.

In another embodiment, features of the invention are implemented primarily in hardware using, for example, hardware components such as Application Specific Integrated Circuits (ASICs) and gate arrays. Implementation of a hardware state machine so as to perform the functions described herein will also be apparent to persons skilled in the relevant art(s).

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A method for achieving high performance I/O write rates in a redundant array of independent disks (RAID) using a fully recoverable command queue stored in non-volatile random access memory (NVRAM) on a RAID controller, the method comprising:

receiving, as input to a host driver executing on a computing device, I/O write requests from an application executing on the computing device, the I/O write requests including inline write commands and I/O write requests other than inline write commands;

writing an inline write command of the I/O write requests from the host driver into the command queue stored in the NVRAM on the RAID controller; and in response to writing the inline write command from the host driver into the command queue, sending, from the host driver to the application, notification of I/O write completion for the inline write command written into the command queue.

2. The method of claim 1, further comprising: determining at the host driver a write data size for an I/O write request received from the application, and selecting an inline write command to be written into the command queue in accordance with the determined write data size of the inline write command.

3. The method of claim 2, further comprising: issuing an inline write command from the host driver to a corresponding direct memory access (DMA) controller in the RAID array if the host driver determines the write data size of the inline write command exceeds an optimum inline maximum.

4. The method of claim 3, further comprising: sending notification of command completion, via the host driver to the application generating the I/O write request, in response to the DMA controller completing the I/O write request and writing to a response queue of the host driver a response indicating command completion.

5. The method of claim 1, further comprising: reading an I/O write request from said command queue at the RAID controller subsequent to the host driver sending notification of I/O write completion to the application generating the I/O write requests.

6. The method of claim 5, further comprising: determining at the RAID controller if the write request read from the command queue is to be executed using inline data.

7. The method of claim 6, further comprising: processing the I/O write request read from the command queue as an inline write command if the RAID controller determines the I/O write request is to be executed using inline data.

8. The method of claim 7, further comprising: removing the I/O write request from the command queue after completion of the I/O write request.

9. The method of claim 6, further comprising: removing the I/O write request from the command queue if the I/O write request is to be processed using a DMA controller.

10. The method of claim 9, further comprising: signaling the corresponding DMA controller in the RAID array to transfer write data to the NVRAM.

11. The method of claim 10, further comprising: writing a response to a response queue indicating command completion after said write data has been transferred to said NVRAM.

12. The method of claim 1, further comprising: booting the CPU on said RAID controller upon recovery from shutdown.

13. The method of claim 12, further comprising: checking said command queue stored in said NVRAM for inline write commands.

14. The method of claim 13, further comprising: issuing said inline write commands to respective disks in said array upon detecting the presence of said inline write commands in said command queue.

15. The method of claim 14, further comprising: completing initialization of said RAID controller subsequent to issuing all inline write commands in said command queue.

16. The method of claim 13, further comprising: completing initialization of said RAID controller upon detecting an absence of inline write commands in said command queue.

17. A computer readable storage medium having stored therein, computer-executable instructions that, if executed by a computing device, cause the computing device to perform a method for achieving high performance I/O write rates in a redundant array of independent discs (RAID) using a fully recoverable command queue stored in NVRAM on a RAID controller, the method comprising:

receiving, as input to a host driver executing on the computing device, I/O write requests from an application, the I/O write requests including inline write commands and I/O write requests other than inline write commands;

writing an inline write command of the I/O write requests from the host driver into the command queue stored in the NVRAM on the RAID controller; and     in response to writing the inline write command from the host driver into the command queue, sending, from the host driver to the application, notification of I/O write completion for the inline write command written into the command queue.

18. The computer readable storage medium of claim 17, the method further comprising: determining at the host driver a write data size for an I/O write request received from the application, and selecting an inline write command to be written into the command queue in accordance with the determined write data size of the inline write command.

19. The computer readable storage medium of claim 18, the method further comprising: issuing an inline write command form the host driver to a corresponding DMA controller in the RAID array if the host driver determines the write data size of an inline write command exceeds an optimum inline maximum.

20. The computer readable storage medium of claim 19, the method further comprising: sending notification of command completion, via the host driver to the application generating the I/O write request, in response to the DMA controller completing the I/O write request and writing to a response queue a response indicating command completion.

21. The computer readable storage medium of claim 17, the method further comprising: reading an I/O write request from the command queue subsequent to the host driver sending notification of I/O write completion to the application generating the I/O requests.

22. The computer readable storage medium of claim 21, the method further comprising: determining at the RAID controller if the write request read from the command queue is to be executed using inline data.

23. The computer readable storage medium of claim 22, the method further comprising: processing the I/O write request read from the command queue as an inline write command if the RAID controller determines the I/O write request is to be executed using inline data.

24. The computer readable storage medium of claim 23, the method further comprising: removing the I/O write request from the command queue after completion of the I/O write request.

25. The computer readable storage medium of claim 22, the method further comprising: removing the I/O write request from the command queue if the I/O write request is to be processed using a DMA controller.

26. The computer readable storage medium of claim 25, the method further comprising: signaling the corresponding DMA controller in the RAID array to transfer write data to the NVRAM.

27. The computer readable storage medium of claim 26, the method further comprising: writing a response to a response queue indicating command completion after said write data has been transferred to said NVRAM.

28. The computer readable storage medium of claim 17, the method further comprising: booting the CPU on said RAID controller upon recovery from shutdown.

29. The computer readable storage medium of claim 28, the method further comprising: checking said command queue stored in NVRAM for inline write commands.

30. The computer readable storage medium of claim 29, the method further comprising: issuing said inline write commands to respective disks in said array upon detecting the presence of said inline write commands in said command queue.

31. The computer readable storage medium of claim 30, the method further comprising: completing the initialization of said RAID controller subsequent to issuing all inline write commands in said command queue.

32. The computer readable storage medium of claim 29, the method further comprising: completing initialization of said RAID controller upon detecting an absence of said inline write commands in said command queue.

\* \* \* \* \*

UNITED STATES PATENT AND TRADEMARK OFFICE
CERTIFICATE OF CORRECTION

| | | |
|---|---|---|
| PATENT NO. | : 7,730,257 B2 | Page 1 of 1 |
| APPLICATION NO. | : 11/012609 | |
| DATED | : June 1, 2010 | |
| INVENTOR(S) | : Chris Robert Franklin | |

It is certified that error appears in the above-identified patent and that said Letters Patent is hereby corrected as shown below:

Column 9
Line 27, Claim 19, "form" should be replaced with --from--.

Signed and Sealed this
First Day of May, 2012

David J. Kappos
*Director of the United States Patent and Trademark Office*